United States Patent [19]

Fukuhara

[11] Patent Number: 4,906,980
[45] Date of Patent: Mar. 6, 1990

[54] DETECTOR OF FALSE ROTATION OF POWER SCREWDRIVER

[75] Inventor: Kenji Fukuhara, Tokyo, Japan

[73] Assignee: Hayashi Tokei Kogyo Kabushiki Kaisha, Tokyo, Japan

[21] Appl. No.: 284,950

[22] Filed: Dec. 15, 1988

[30] Foreign Application Priority Data

Jan. 14, 1988 [JP] Japan .................................. 63-6234

[51] Int. Cl.⁴ ............................................. G08B 21/00
[52] U.S. Cl. ..................................... 340/680; 29/407; 81/429; 340/540; 340/679
[58] Field of Search ............... 340/680, 679, 540, 664; 29/407, 708, 798; 81/429, 52; 173/45, 20, 2

[56] References Cited

U.S. PATENT DOCUMENTS 4,571,696  2/1986  Bitzer ..................................... 29/407
4,620,450  11/1986  Yamaguchi ........................... 29/407

Primary Examiner—Glen R. Swann, III
Attorney, Agent, or Firm—Henry C. Nields

[57] ABSTRACT

The start of the final tightening of a screwdriver and rotation of the screwdriver after the start of the final tightening are detected. The detected rotation is compared with a standard value. The screwdriver should rotate very little during the final tightening, if it is normally operated. Consequently when the detected rotation is more than the standard value, one may assume false rotation of the screwdriver has occurred.

6 Claims, 6 Drawing Sheets

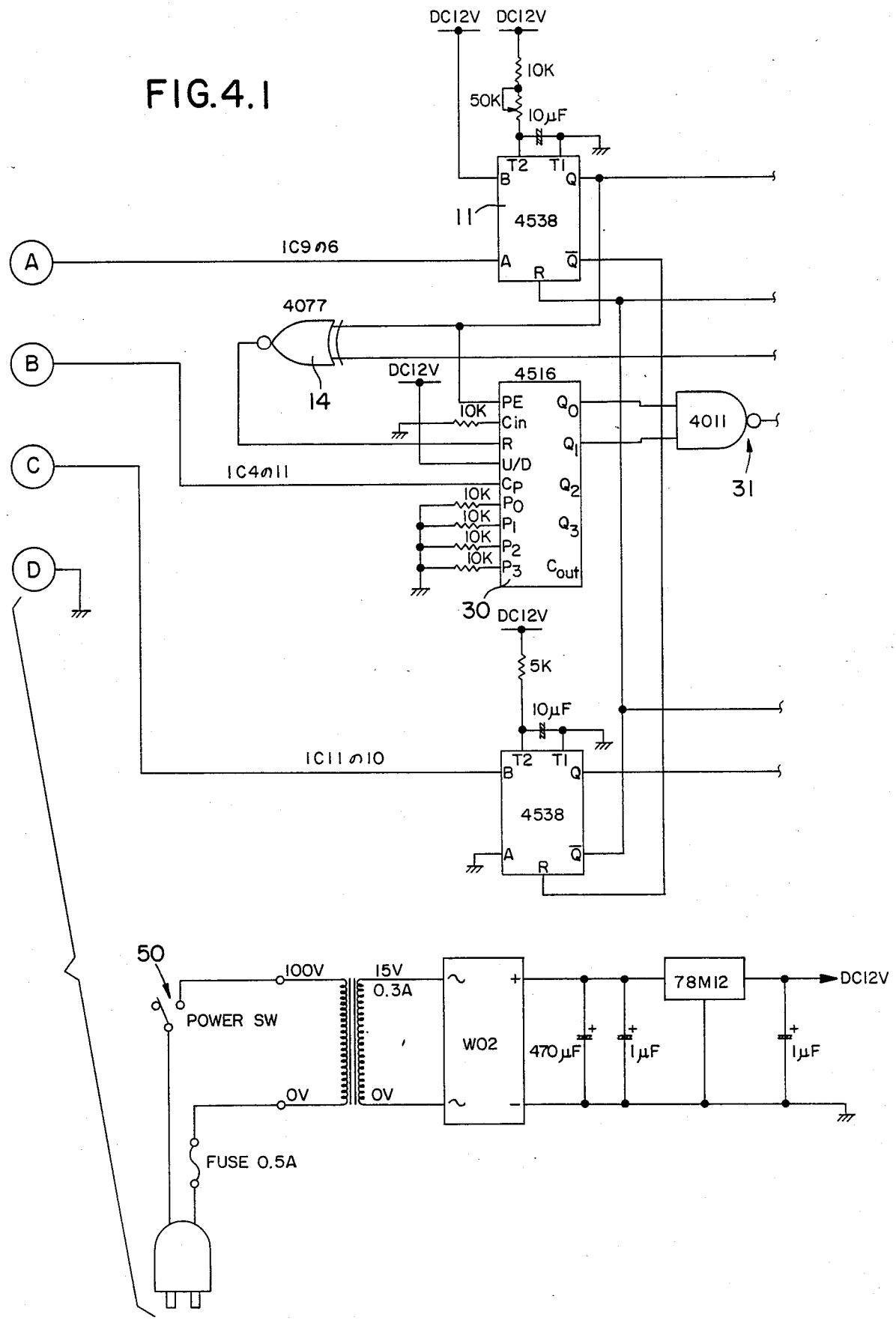
FIG.4.1

FIG.4.2
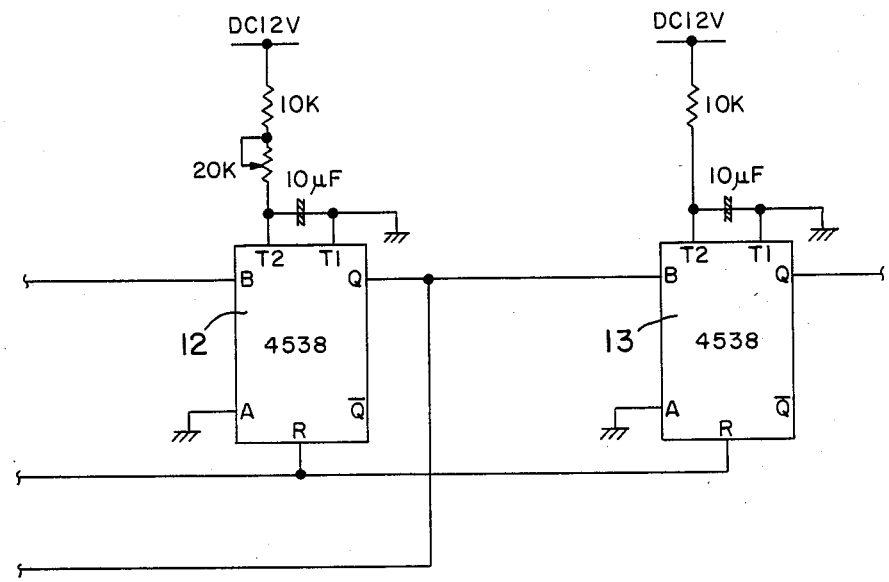
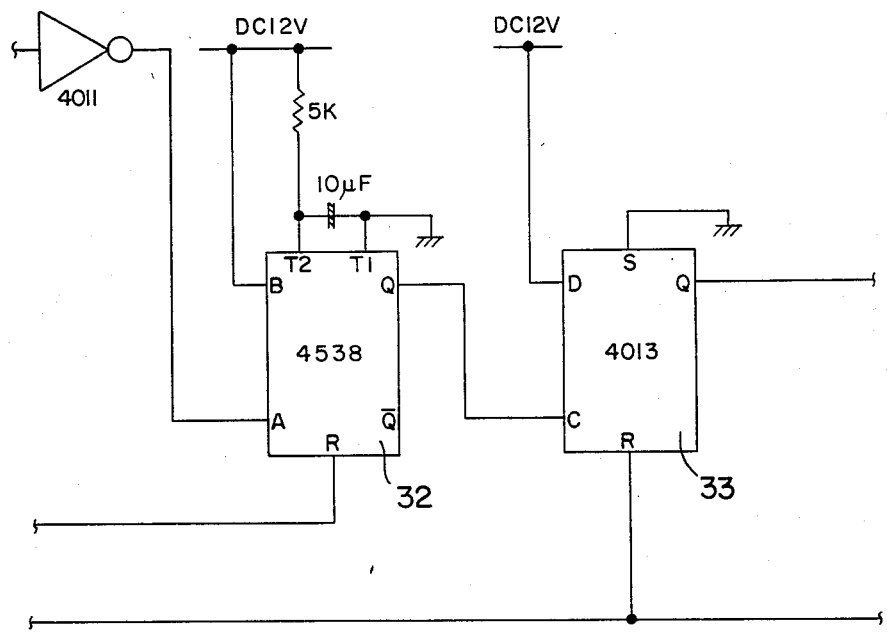

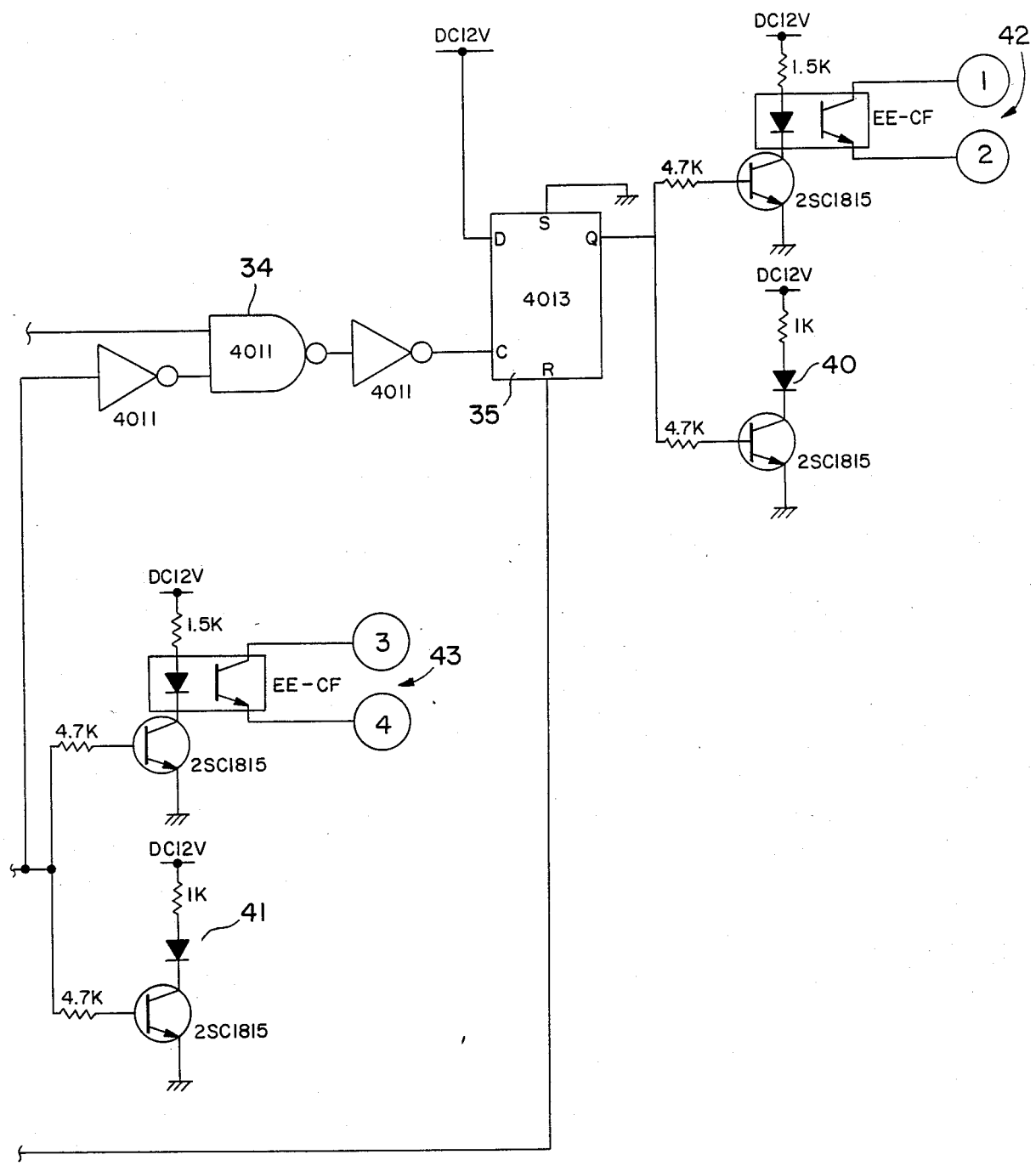
FIG.4.3

DETECTOR OF FALSE ROTATION OF POWER SCREWDRIVER

BACKGROUND OF THE INVENTION

The present invention relates to a detector of false rotation of a power screwdriver operated by an electric motor.

Power drivers are utilized as screwdrivers in the field of precision machinery such as assembly of watches.

In screwing with power screwdrivers, the power is increased to strengthen the rotation torque when the screwdriver screws tight and can not rotate anymore. By increasing the power, the screwdriver tries to rotate, sometimes rotates a little bit and tightens the screw. The operation is called "MASHIJIME", which means final increased tightening.

The screwdriver occasionally rotates a half revolution or more in the final tightening for several reasons. One reason is that the bit of the driver rotatably slides on the screw because the bit does not match the head of the screw. Another reason is that the final tightening starts before the screw is screwed tight and the screwdriver rotating due to misoperation or a burr's stopping the rotation.

Such false rotation of the screwdriver causes very weak screwing without the final tightening, so that the device to be screwed become substandard.

In manual operation the operator may note and detect the wrong rotation of the bit. But nowadays screwdrivers are mostly operated by automatic machines like robots, which makes it difficult to detect the false rotation of the bit and causes many weak-screwed substandard devices.

An object of the invention is to provide a detector which can detect false rotation of a power screwdriver in final tightening operation.

A further object of the invention is to provide a detector which can indicate occurrence of false rotation.

BRIEF DESCRIPTION OF THE DRAWINGS

FIG. 4 is a detail block diagram showing one embodiment of the invention.

DETAILED DESCRIPTION OF THE PREFERRED EMBODIMENTS

Figure 1:
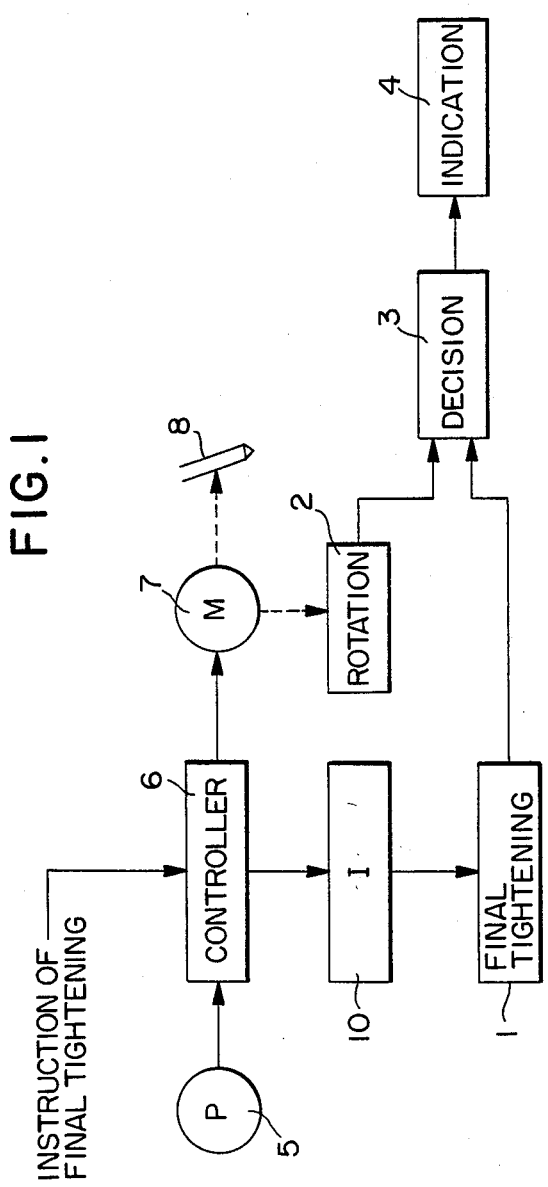
FIG. 1 is a block diagram showing one embodiment of the invention.

In the embodiment shown in FIG. 1, a power screwdriver comprises a power supply 5, a motor controller 6, a motor 7 and a bit 8. The motor controller 6 receives an instruction signal for final tightening from an operation switch (not shown) or other controllers. The motor controller 6 responds to the signal to increase current supply to the motor 7, by which rotation torque of the motor 7 increases and the final tightening is carried out.

A detector of false rotation of the present invention comprises a final tightening start detector 1 which has a current detector 10 to detect the current flowing in the motor 7 through the motor controller 6. The start detector 1 detects the start of the final tightening by the change of the motor current. Since the motor current increases when the power supplied to the motor 7 increases at the start of the final tightening, the start detector 1 picks up the increase of the motor current and thus detects the start of the final tightening.

The start detector 1 may receive the output from the rotation detector 2 (explained later) to detect the start of the final tightening. Since the final tightening starts just after rotation of the motor 7 stops, the start point of the final tightening can be detected by the rotation stop of the motor 7.

The output of the start detector 1 for detecting the start of the final tightening is transmitted to a discriminator 3. An optical rotation detector may be employed as the rotation detector 2 for detecting the rotation. In this embodiment, the rotation detector 2 is an optical detector supplying 6 pulse signals per one rotation of the motor 7. The rotation signal is transmitted to the discriminator 3 as well. The discriminator 3 starts to detect the rotation signal of the motor 7 from the rotation detector 2 after receiving the output of the start detector 1 indicating the start of the final tightening. The detected rotation signal is compared in the discriminator 3 with a standard value.

The motor 7 rotates only slightly in the final tightening operation. The discriminator 3 may decide that a false rotation has occurred if it detects more than a half a rotation. In this embodiment, the standard value is set at half a rotation (three pulses) and the discriminator 3 decides that the wrong rotation occurs when more than three pulses are transmitted from the rotation detector 2.

The output signal of the discriminator 3 is supplied to an indicator 4, by which the occurrence of the false rotation of the bit 8 is indicated. The indicator 4 may be a warning lamp or the like.

Figure 2:
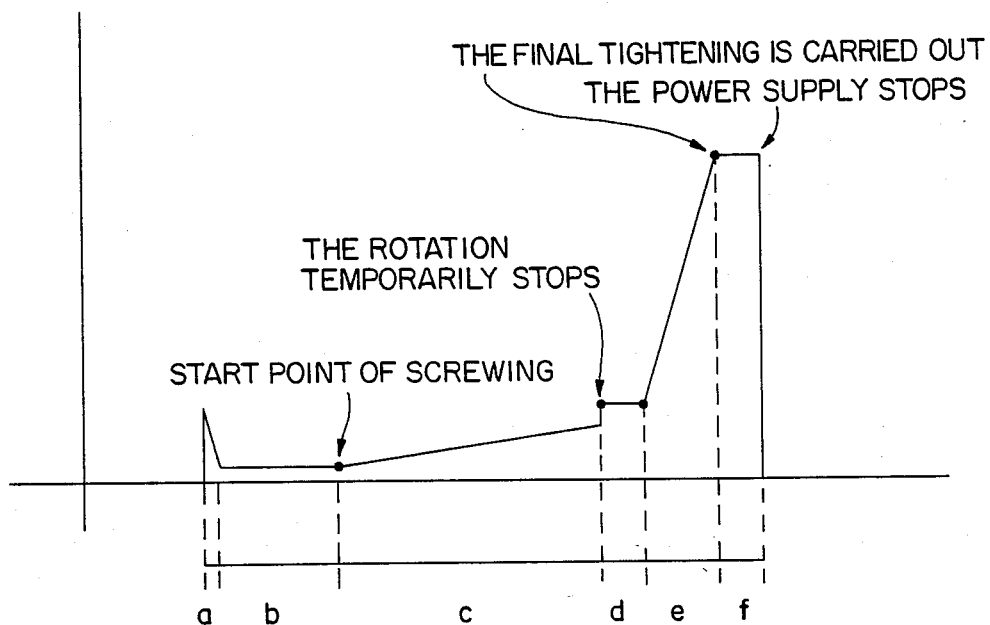
FIG. 2 is a graph showing relation between motor current and time to explain the operation of a power screwdriver.

The operation of the embodiment of FIG. 1 will now be described with reference to FIG. 2 current flowing in the motor 7 when the power screwdriver starts to rotate decreases down to a stationary state (a, b period). The operator starts to screw, then the screw is tightened and the torque increases gradually. The current flowing in the motor 7 increases depending on the torque increase (c period). When the screw abuts burrs or the like, or it is almost tightened to a face of the work, the motor is forced to temporarily stop rotating (d period).

The instruction of the final tightening is delivered to the motor controller 6, and then the motor controller 6 starts to increases the power supplied to the motor 7 to start the final tightening. Then the current in the motor 7 starts to increase again (e period).

The start detector 1 detects the increase of the current through the current detector 10 and acknowledges that the final tightening has started. The output of the start detector 1 is transmitted to the discriminator 3.

The electric current flowing in the motor 7 gradually increases corresponding to tightening up the screw (e period). When the tightening is accomplished, the motor controller 6 stops supplying power (0.2 second after accomplishing the tightening in this embodiment) corresponding to the instruction signal from the operator or controller (f period). During the e and f period, the discriminator 3 receives the signal from the rotation detector 2 representing the rotation of the motor 7 and the discriminator 3 compares the signal with the standard value. As described above, half a rotation is the threshold value so that the discriminator 3 provides a decision of the false rotation occurrence of the bit 8 when it receives more than three pulses. The signal of the decision is transmitted to the indicator 4 to indicate it to the outside.

Figure 3:
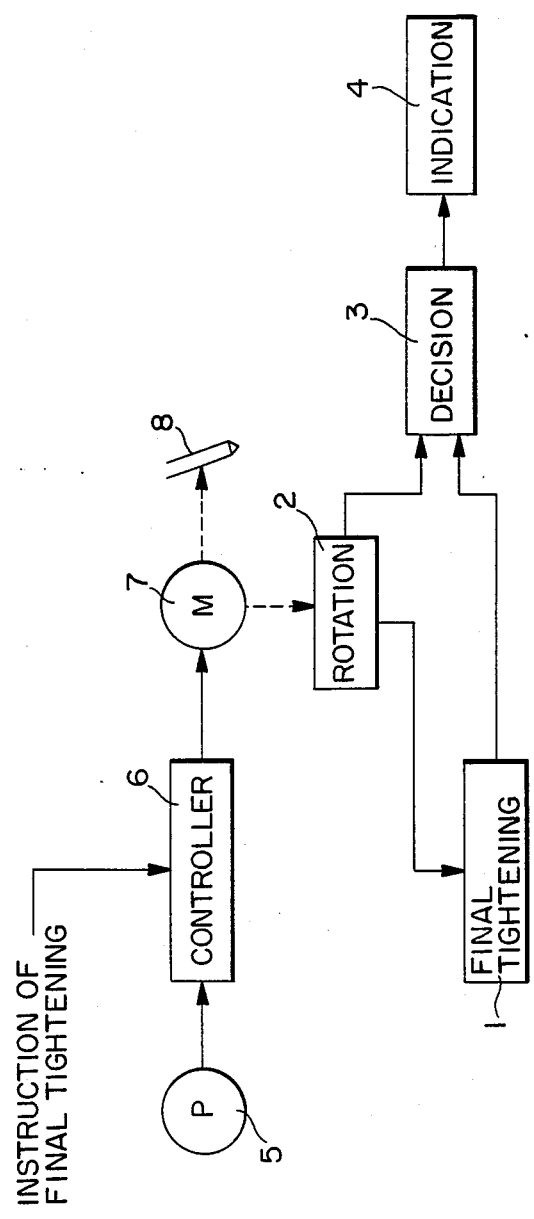
FIG. 3 is a block diagram showing another embodiment of the invention.

The signal of the decision from the discriminator 3 may be fed back to the robot or the like which operates the power screwdriver. FIG. 3 shows another embodiment which utilizes the signal of the motor rotation from the rotation detector 2 as a indication signal of the start of the final tightening instead of the signal from the current detector 10. As shown in FIG. 2, there is little time difference between the motor stop point and the final tightening start point, but the difference would be almost negligible. Furthermore a delay device may be employed in the start detector 1 to adjust the difference.

FIG. 4 shows the detail block diagram of the start detector 1, the discriminator 3 and the indicator 4.

The start detector 1 consists of a series of timers 11,12,13 which receives the signal of the final tightening start from the current detector 10 or the rotation detector 2 through a terminal A. The timer 11,12 provide a pulse signal with predetermined pulsewidth to generate a counter 30 through a gate 14. The counter 30 is enabled during the time of the pulsewidth to count the rotation signal of the motor from the rotation detector 2 through a terminal B. In the embodiment shown, the rotation detector 2 provides 6 pulses per one rotation of the motor. The counter 30 outputs the signal to a gate 31 when it has counted more than 3 pulses during said period and activates a hold circuit 32 and 33. The hold circuit 32,33 provides a pulse signal for a predetermined period to activate an NG lamp 41 and to provide an NG output 43. The operator can note from the NG lamp 41 that false rotation happens on the driver.

When the counter 30 does not count more than three pulses, a signal is supplied to a hold circuit 35 from an AND gate 34 to light an OK lamp 40 and to provide an OK output 42.

Light emitting diodes are employed as the OK lamp 40 and the NG lamp 41 in the embodiment shown. Terminal C receives a reset signal to clear the timer 11,12,13 and the hold circuit 32,33,35. 50 indicates a power circuit.

What I claim is:

1. A detector of false rotation of a power screwdriver comprising:
   means for detecting the start of a final tightening of a screwdriver,
   means for detecting rotation of the screwdriver after the start of the final tightening;
   means for comparing the detected rotation with a standard value.
2. The detector as claimed in claim 1 comprising:
   means for indicating a result of said comparing.
3. The detector as claimed in claim 1 comprising:
   means for deciding that false rotation happens when the rotation of the screwdriver is more than the standard value.
4. The detector as claimed in claim 1 wherein:
   said standard value corresponds to half a rotation of the screwdriver.
5. The detector as claimed in claim 1 wherein:
   said means for detecting the start of a final tightening of a screwdriver detects motor electric current.
6. The detector as claimed in claim 1 wherein:
   said means for detecting the start of a final tightening of a screwdriver detects stoppage of a motor.

* * * * *